United States Patent Office 3,378,909
Patented Apr. 23, 1968

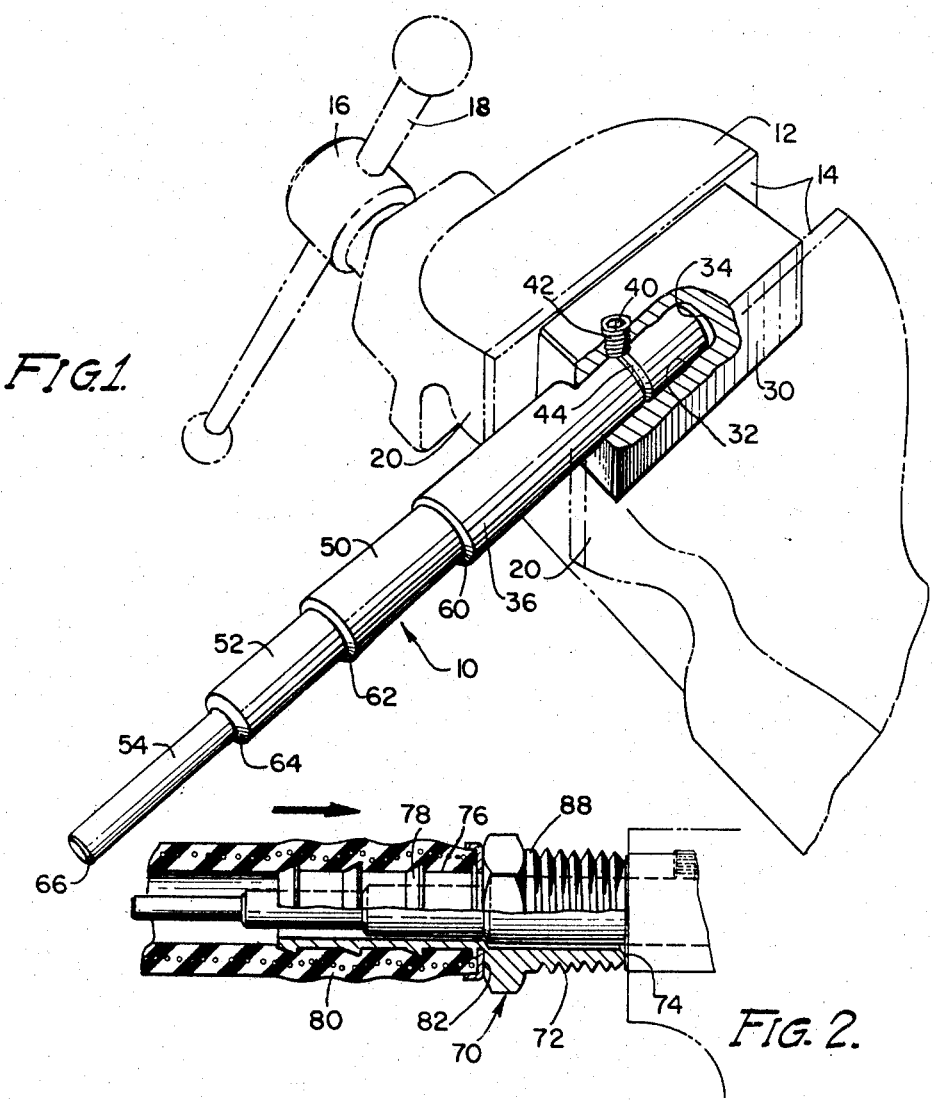
*Fig. 1*
*Fig. 2*
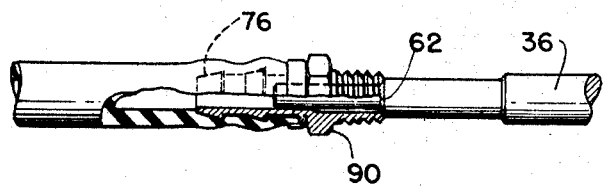
*Fig. 3*
INVENTOR
FRANK P. ESPOSITO

3,378,909
ASSEMBLY TOOL FOR HOSE FITTINGS
Frank P. Esposito, 1527 S. Wisconsin Ave.,
Berwyn, Ill. 60402
Filed Oct. 26, 1966, Ser. No. 589,659
3 Claims. (Cl. 29—235)

ABSTRACT OF THE DISCLOSURE

The present invention provides a tool with its body adapted to resist thrust force transmitted along the axis of a mandrel or shaft due to the push action used in assembling flexible hose onto the barbed nipple of a tubular fitting, the fitting being of the type used in pneumatic, hydraulic systems or the like. The tool shaft is stepped along its length at a series of shoulders. Each shaft step is sized to receive the bore of successively smaller fitting for an assembly operation, with the adjacent shaft shoulder is sized to hold thereagainst the remote end of the fitting. The shoulder receives and transmits the thrust force of the assembly operation to the body of the present tool with the tool being held against movement during the operation.

Disclosure

The present invention relates to an assembly tool and more particularly to a tool to facilitate the assembly of flexible hose onto the nipple of a rigid socketless fitting.

In assembling flexible hose onto unions or other fittings for use in pneumatic or hydraulic systems, a preferable type of fitting employs the use of thrust force to push the end of the hose onto a barbed nipple. The barbs on the nipple hold the hose tightly in place and no screws, rings or other holding devices need be used. It is to to the assembly of this type of hose fitting that the present invention is directed.

In each such assembly operation, using tools known in the art, the following steps are usually necessary: First, the fitting is mounted in a vise. The hose is then guided onto the fitting nipple and by pushing and working, the hose is forced onto the nipple. The vise is them opened, a new fitting is placed in the vise and the vise is re-closed for the next operation.

To minimize the number of steps in this series, and to facilitate the guiding of the hose, my invention has been evolved. Utilizing my invention, the tool is placed in a vise or held in any convenient manner against the generally horizontal thrust force to be applied in the assembly. Once set in the holder, fittings of different sizes may be assembled to hoses of the proper size in any interchangeable or random sequence with no change in set-up required. In addition, the entire operation may be resorted to without recourse to any hand tools.

It is therefore an object of my invention to provide a new and improved assembly tool for readily mounting individual hoses onto individual socketless fittings.

It is a further object of my invention to provide a single assembly tool which interchangeably accepts fitting of any size, and which will hold such fitting firmly during the assembly of a hose onto the fitting, and which is immediately ready to accept any size fitting for the next operation.

These and other features, objects and advantages of my invention will be apparent from the following description viewed in conjunction with the accompanying drawings, in which:

FIGURE 1 is a perspective view partially broken away, showing an embodiment of the tool of my invention mounted in a vise ready for use;

FIGURE 2 is a side view in section of the tool of FIGURE 1 as used in assembly operation with a fitting of one size; and FIGURE 3 is a side view, partially broken away of the tool of FIGURE 1, as used for the assembly of a smaller size hose and fitting.

Viewing the drawings in detail, FIGURE 1 shows a tool 10 employing my inventive concept, as mounted within a standard shop vise 12. The vise 12 may be of the conventional type in which parallel jaws 14 are drawn together or separated by the action of a rotatable handle 18 controlling the movement of a lead screw 16. At either end, the vise jaws terminate at shoulders 20 which form the extremities of the vise.

The tool 10 has a main body or housing 30, which in the example shown, is a block of regular rectangular configuration. At one end, the body 30 has a circular socket 32 which is closed at its inner end 34. Fitted into socket 32 is the central shaft or mandrel 36 which butts against the socket inner end 34. The shaft 36 may be press fitted into the socket, or as shown, may be held in place by the use of a set screw 40. The set screw, in a conventional manner extends through a threaded hole in the wall of housing 30 normal to the axis of shaft 36 and socket 32. To receive the set screw, the shaft may be scored or notched annularly about its periphery as indicated by the reference numeral 44.

The shaft 36 has a series of steps or successively smaller diameter rod sections 50, 52 and 54 spaced along its extent outwardly of the shaft mounting in socket 32. There are three smaller diameter sections shown, although two, four or five sections may be used depending on the number of different size fittings and hoses to be used in the field to which the tool is to be applied.

Each rod section is stepped from the adjacent larger section at an annular shoulder, the shoulders being numbered 60, 62 and 64. Each of these shoulders is tapered slightly inwardly and forwardly toward the free end 66 of the shaft to facilitate the insertion and removal of fittings from the shaft.

The shaft 36 may be formed of a single length of bar stock with the successive sections being turned to successively greater depths. In another form, the sections may be constructed of integral rods fitted individually into sockets in the end of the adjacent larger rod section. In any event, the end product assumes generally the shape shown in FIGURE 1.

Although only a rectangular shaped housing has been shown, it is clear that the housing in another form may have arms extending from the main body 30 to rest in front of and against the vise shoulders 20. Such arms would in themselves resist the thrust forces of an assembly operation and would transmit these thrust forces to the vise shoulders 20, rather than to the vise gripping surfaces. In addition, other conventional holding devices rather than a vise may be used to hold housing 30. For example, if desired, the housing 30, in the shape shown by the drawings, could be permanently affixed to a wall or similar surface.

A typical fitting assembly is shown resting on the tool in FIGURE 2. The fitting, as is generally known, has a main body or hub 74 with a conventional hexagonal shape. At one end, the hub 70 leads into an externally threaded section 72 for subsequent connection into a fluid flow system. In other forms, the threaded section could be internally tapped. Extending from the other end of the hub 70 is a tubular nipple 76 with annular or peripheral barbs spaced along its length. The barbs are individually somewhat saw-toothed in section to hold the hose 80 thereon. The entire fitting has a central continuous bore 79 axially through the nipple 76, the hub 70 and the threaded section 72. A flexible hose 80 sized to fit tightly on the nipple is shown in FIGURE 2 fully assembled on the nipple with the hose end 82 adjacent the nipple end of the hub 70.

To utilize my invention in the assembly of a hose onto a properly sized fitting, the tool block 30 is placed in the vise with the shaft 36 extending substantially horizontally. A fitting is placed on the shaft so that the fitting threaded end butts against the proper one of the shoulders 60, 62 or 64, or against the block 30 depending on the size of the fitting bore. The fitting has thus been pushed manually onto the shaft as far as it will go, and until the fitting has contacted a shoulder greater on size than the fitting bore. The bose 80 is guided over the shaft 36 and onto the nipple 76. The hose is then pushed and worked over the nipple barbs until the hose end 82 abuts the edge of hub 70. During this assembly, the fitting will transmit the pushing or thrust force against the tool 10 and the fitting holder will resist the thrust transmitted by the tool 10. The hose and fitting once assembled can be slid off the shaft 36 as an assembled unit, and the tool shaft is then ready to accept whatever size fitting is placed on it.

In FIGURE 2, there is shown a comparatively large fitting 88, wherein the fitting will butt against the edge of the tool body, indicated by the numeral 74. In the example of FIGURE 3, a smaller fitting 90 is shown in the assembly process. The fitting 90 is held by the shoulder 62 of shaft 36, while a hose 92 of the proper size is press fitted onto the nipple 76 to complete the assembly in the manner previously described.

In either of these cases, the operation is virtually the same, and operations for fittings of the different possible sizes may be effected interchangeably without the necssity for any hand tools or resetting of the apparatus between assembly operations.

While there has been described what is at present thought to be the preferred embodiment of the invention, it will be understood that modifications may be made therein and it is intended to cover in the appended claims all such modifications as fall within the true spirit and scope of the invention.

What I claim is:

1. A tool for assembling flexible hose onto tubular barbed fittings, comprising:

a mounting base shaped to be held rigidly in a fixed thrust resistant position, a shaft extending from said base for accepting thereon the bore of a fitting, a plurality of successively smaller shaft sections on said shaft spaced from one another by shoulders, the diameter of said shaft sections each sized to receive thereon a fitting which abuts against the shoulder adjacent said section to receive thrust force generated during the assembly of a hose onto a fitting nipple.

2. A a tool as claimed in claim 1, in which each of said shoulders is tapered toward the shaft end to facilitate application and removal of the fitting.

3. An assembly tool for mounting in random sequence individual different size flexible hose onto the nipple of tubular fittings of the proper sizes, comprising:

a shaft, a shoulder on said shaft leading to a first reduced diameter section of said shaft, said shoulder sized to be greater than the bore of one fitting, the shaft first section sized to receive thereon the bore of said fitting while said shoulder holds thereagainst a wall of said fitting, one or more other shoulders on said shaft leading to one or more successive reduced diameter sections, each of said one or more shoulders and shaft sections sized to receive and hold successively smaller fittings, and a base including means for holding said shaft to resist the thrust force exerted by the operation of assembling a properly sized hose onto the nipple of the fitting by push action.

References Cited
UNITED STATES PATENTS

| | | | |
|---|---|---|---|
| 612,357 | 10/1898 | Leigh | 29—237 |
| 1,107,624 | 8/1914 | Mann | 211—123 |
| 2,766,804 | 10/1956 | Kaiser | 29—237 |
| 2,803,210 | 8/1957 | Lohman | 269—52 |
| 3,127,672 | 4/1964 | Kretschmer | 29—237 X |

MILTON S. MEHR, *Primary Examiner.*